United States Patent [19]

Hunt

[11] 4,396,852
[45] Aug. 2, 1983

[54] WINDMILL

[76] Inventor: Arlon J. Hunt, 2025 Manzanita Dr., Oakland, Calif. 94611

[21] Appl. No.: 281,930

[22] Filed: Jul. 10, 1981

[51] Int. Cl.³ .......................................... H01L 41/00
[52] U.S. Cl. ................................. 310/329; 310/333; 310/339
[58] Field of Search ............... 310/329, 333, 339, 369; 290/43, 44, 54, 55

[56] References Cited
U.S. PATENT DOCUMENTS

| | | | |
|---|---|---|---|
| 2,625,663 | 1/1953 | Howatt | 310/333 |
| 2,671,178 | 3/1954 | Tomcik | 310/333 X |
| 3,519,009 | 7/1970 | Rubin | 310/330 X |
| 3,666,976 | 5/1972 | Gourlay et al. | 310/324 |
| 4,005,319 | 1/1977 | Nilsson et al. | 310/339 |
| 4,024,409 | 5/1977 | Payne | 290/55 |

*Primary Examiner*—William M. Shoop
*Assistant Examiner*—Peter S. Wong
*Attorney, Agent, or Firm*—Fliesler, Dubb, Meyer & Lovejoy

[57] ABSTRACT

A windmill (10) has a member (12) which is torsionally displaceable and coupled to a transducer (62) to produce usable energy.

22 Claims, 7 Drawing Figures

FIGURE 2
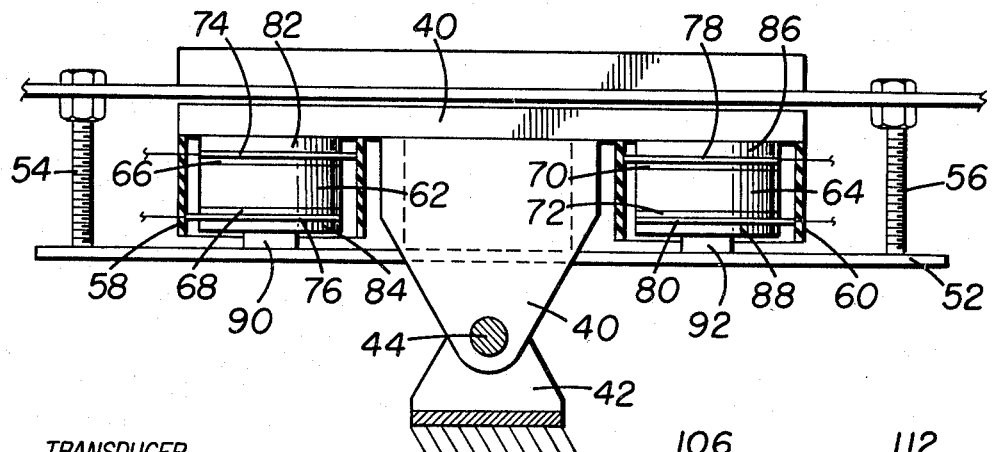
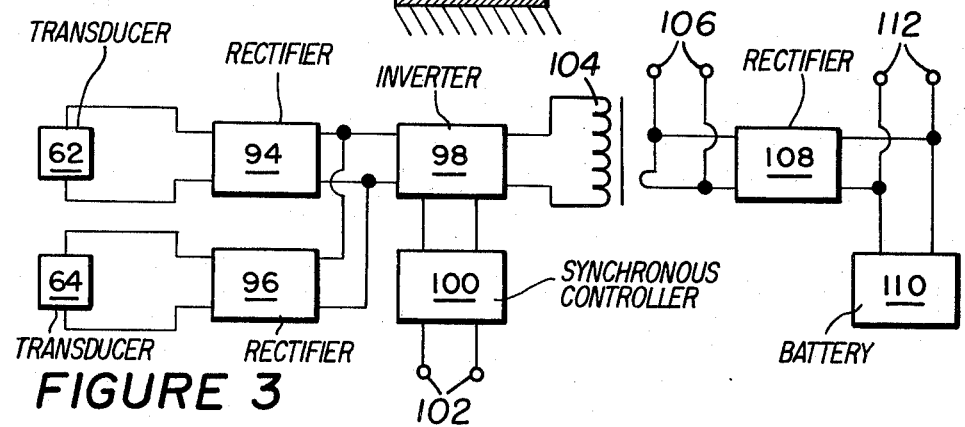
FIGURE 3
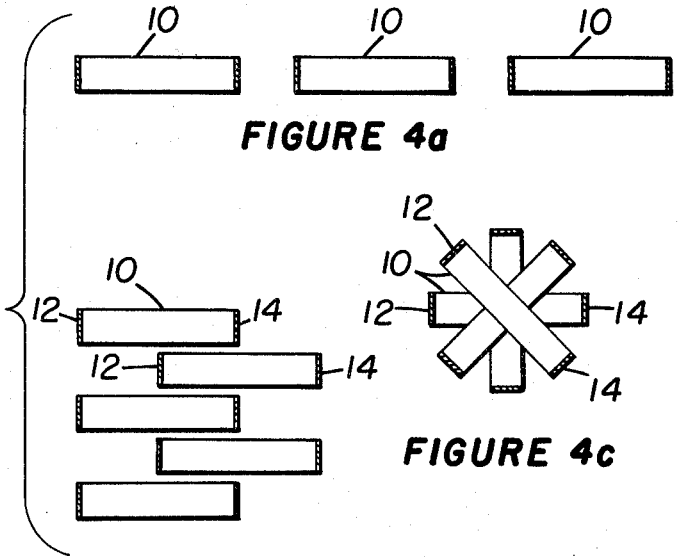
FIGURE 4a
FIGURE 4
FIGURE 4b
FIGURE 4c

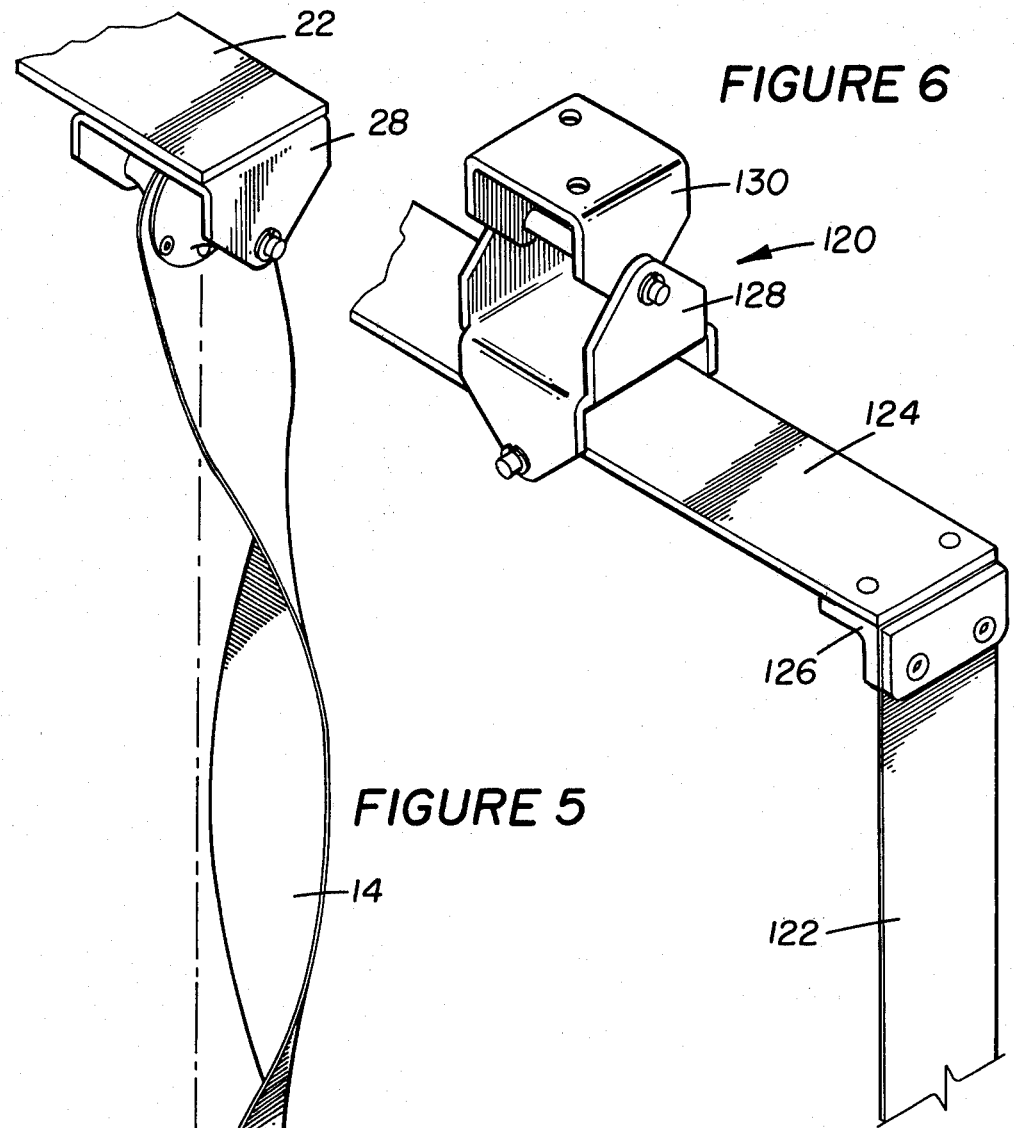

WINDMILL

TECHNICAL FIELD

This invention relates to devices that extract energy from a moving fluid.

BACKGROUND ART

The kinetic energy of moving wind has been converted by various devices into mechanical motion to accomplish useful work for many centuries. This energy has been used to pump water, grind grains, provide mechanical power for a variety of uses, and in this century, generate electricity. The overwhelming majority of these devices rely on an air foil or sail to convert the linear motion of the wind to rotational motion of a windmill shaft.

Rotary windmills are divided into two main categories depending on whether the axis of rotation is oriented in a horizontal or vertical plane. The oldest known horizontal axis windmills were the post mills, the predecessors of the "Dutch" windmills. The American multi-vane fan type windmills gained considerable use in the American west during the late 19th century as water pumpers. More recently, the propeller-type windmills have become popular because of their higher efficiency and small blade area.

A horizontal axis windmill requires a tower strong enough to withstand the axial forces produced by the blades, a device to orient the blades to face the wind, a feathering device to give protection from strong winds, and a series of gears to convert the rotational speed of a shaft to the optimal speed for the desired use. In most designs, the windmill must be located at the top of a tower, complicating its installation, maintenance and repair.

There are a variety of vertical axis machines now being used or under development. They include wind turbines, Savonius rotors, Darrieus rotors, giromills, vortex generators and several other concepts. Vertical axis machines generally do not need to be oriented toward the wind, and some types do not require towers. These advantages are offset, however, by a significantly lower efficiency of extracting power from the wind. In addition, the most popular type, the Darrieus rotor, is not self-starting, and structural stability problems may significantly limit the useful lifetime. Almost all of the vertical axis machines used for power production require gear reduction systems and large structures that rotate at high velocities.

Traditionally, windmills have been used extensively for pumping water, producing small amounts of electricity at remote sites, and more recently in large scale multi-megawatt installations. In the past few years, a variety of horizontal axis, kilowatt sized windmills have become available for home or farm use. However, there are a number of objections to using windmills in residential or urban settings. The tower and equipment involved often clash aesthetically with the residential environment. The tower height and high rotational velocity of the blade tips can pose significant safety problems. Also there are problems with television interference caused by varying reflections from the blades.

Further, the costs for these machines are high because the number of units manufactured is not large enough to take advantage of mass production techniques.

In a more general sense, the kinetic energy of a moving fluid may be converted to the motion of a solid body in a variety of ways. Sail boats, ice boats, and vehicles equipped to run on rails have been used to convert wind power to linear motion. In a prior device that is disclosed in U.S. Pat. No. 3,987,987, issued on Oct. 26, 1976 to Peter R. Payne, a self-erecting windmill uses the back and forth motion of tethered air foils to extract wind energy by forcing the tethering line to turn a shaft.

In U.S. Pat. No. 4,024,409, issued on May 17, 1977 to Peter R. Payne, a device is disclosed that uses cylindrical cables to extract wind energy by inducing a transverse oscillatory motion. Mechanical power is extracted from the system by use of a diaphragm pump. In the same patent, a device is proposed to generate electricity by the motion of the cable in a magnetic field produced by permanent magnets. All of the devices discussed in this patent rely on the induced lateral motion of a cylindrical cable in the wind. It is a well known result that the power flow through the cross section of a cable is proportional to the square of the lateral displacement, the tension of the cable to the three halves powers, and is inversely proportional to the length of the cable. To obtain significant power from a vibrating cable, both the lateral motion and the tension in the cable must be high. However, the wind will not induce large amplitude motion in a tight cable unless it is long. Further, since the power in the cable is inversely proportional to its length, devices based on the lateral motion of cylindrical cables cannot efficiently extract energy from the wind or deliver power commensurate to their size.

Another significant drawback of these devices is that they suffer from a lack of an energy conversion system or transducer portion of the device that is well matched to the characteristics of the wind energy collector portion of the device. In addition, the motion of the cable will not generally be confined to a plane, causing the cables to hit the magnets. Further, the device is proposed for use in single units, not a coordinated set of devices to scale to the desired power. Another disadvantage of the device is that it uses heavy and expensive permanent magnets to provide the magnetic field. Another complication arises because the cylindrical cable must always oscillate with a motion perpendicular to the magnetic field such that a guiding vane is necessary to orient the magnets in the proper direction. The limitations engendered in vibrating systems that rely on lateral motion of cylindrical cables leave open the possibility of other shapes and types of motions that can more efficiently couple wind energy to a vibrating member.

The present invention is directed to overcoming one or more of the problems as set forth above.

DISCLOSURE OF THE INVENTION

This invention relates to a windmill that extract energy from the motion of the wind by use of the vibration of a thin, substantially flat, long member, referred to here as a slat.

In one aspect of this invention, the method used to extract power from the wind utilizes the torsional or twisting vibrational motion of the slat between nonrotating ends. The torsional vibrational motion induces a varying tension at the end of the slat that can provide power to a transducer.

In another aspect of the invention, the method used to extract power from the wind utilizes the sideways motion of the slat. The sideways motion induces a varying tension at the end of the slat that can provide power to a transducer.

In another aspect of the invention, a method based on the combination of the sideways motion and the torsional motion of the slat is used to extract power from the wind.

In another aspect of the invention, a method based on the resonance between the vibration of the slat end and a spring-mass system with a restoring force is used to enhance the power transmitted to a transducer.

The spring-mass system matches the motion of the end of the slat to the motion required for proper operation of the transducer. The system may be a simple or compound lever or system of levers.

In another aspect of the invention, a method uses the motion of the end of the slat to cause a varying compression of a piezoelectric transducer element to generate electrical energy.

In another aspect of the invention, an apparatus is provided for carrying out the above methods. Such apparatus includes a means disposed in a source of fluid in motion for moving in response to the motion of the fluid therepast. Further, such apparatus includes means operatively coupled to the moving means for converting said movement into usable energy, said converting means including a piezoelectric transducer.

In yet another aspect of the invention, the apparatus includes means disposed in the fluid for torsional movement in response to the movement of the fluid therepast. The apparatus further includes means operably coupled to the torsional movement means for converting the torsional movement into usable energy.

The advantages over the prior art of this invention are as follows. First, the present invention does not require a tower or heavy machinery located high above the ground. Thus, potential hazards associated with high speed rotational equipment are eliminated. Also, as no gears are used, as in conventional windmills, maintanence of gearboxes, bearings and generators is eliminated.

The slats may be mounted in any convenient orientation on a frame constructed for that purpose, or onto, or between pre-existing structures. This is possible because the length of the slat may vary over a wide range. The slats may be mounted between buildings or suspended from bridges or overhangs with weights to provide tension. The slats may be used singly, or in a group that may be arranged in a variety of ways. In one embodiment, one or more slats are mounted to the mast or rigging of a sailing ship to provide electricity for direct use, for charging batteries or for both.

The appearance and operation of the present invention fit well into an urban or suburban surrounding.

As another advantage, the present invention is quite insensitive to the orientation of the ends of the slat to the wind direction. Wind from opposite directions can excite vibrations equally well. Tyipcal torsional excursions of the slat are sufficiently large that it presents nearly the same cross sectional area to the wind regardless of the wind direction. Thus, the present invention does not require orientation with respect to the wind direction.

The present invention can be modular in nature so that for increased power generation capacity a multiplicity of slats can be used.

Another advantage of the invention is that with a plurality of slats there is significant energy production potential at lower total power ratings than conventional rotating windmills.

The slat need not have vertical orientation but can be mounted at any angle with respect to the earth. Because wind motion is generally parallel to the ground, a slat mounted other than vertically should be arranged so as to be broadside to the prevailing winds.

Another advantage of this invention is the lack of a need to provide a mechanism to cause the system to turn into the wind.

Further objects and advantages of the invention will become apparent from a consideration of the drawings and accompanying description thereof.

BRIEF DESCRIPTION OF THE DRAWINGS

FIG. 2 is a side elevational view of a portion of the embodiment of FIG. 1;

FIG. 3 is a schematic diagram of an electrical circuit of the invention;

FIGS. 4a, b and c are three alternate embodiments of the invention;

FIG. 5 is a perspective view of a portion of the embodiment of FIG. 1 with an elongate slat thereof torsionally displaced;

FIG. 6 is a perspective view of an alternate embodiment of the invention; and

FIG. 7 is a perspective, cross-sectional view of an alternate embodiment for the piezoelectric transducer of the invention.

BEST MODE OF CARRYING OUT THE INVENTION

Figure 1:
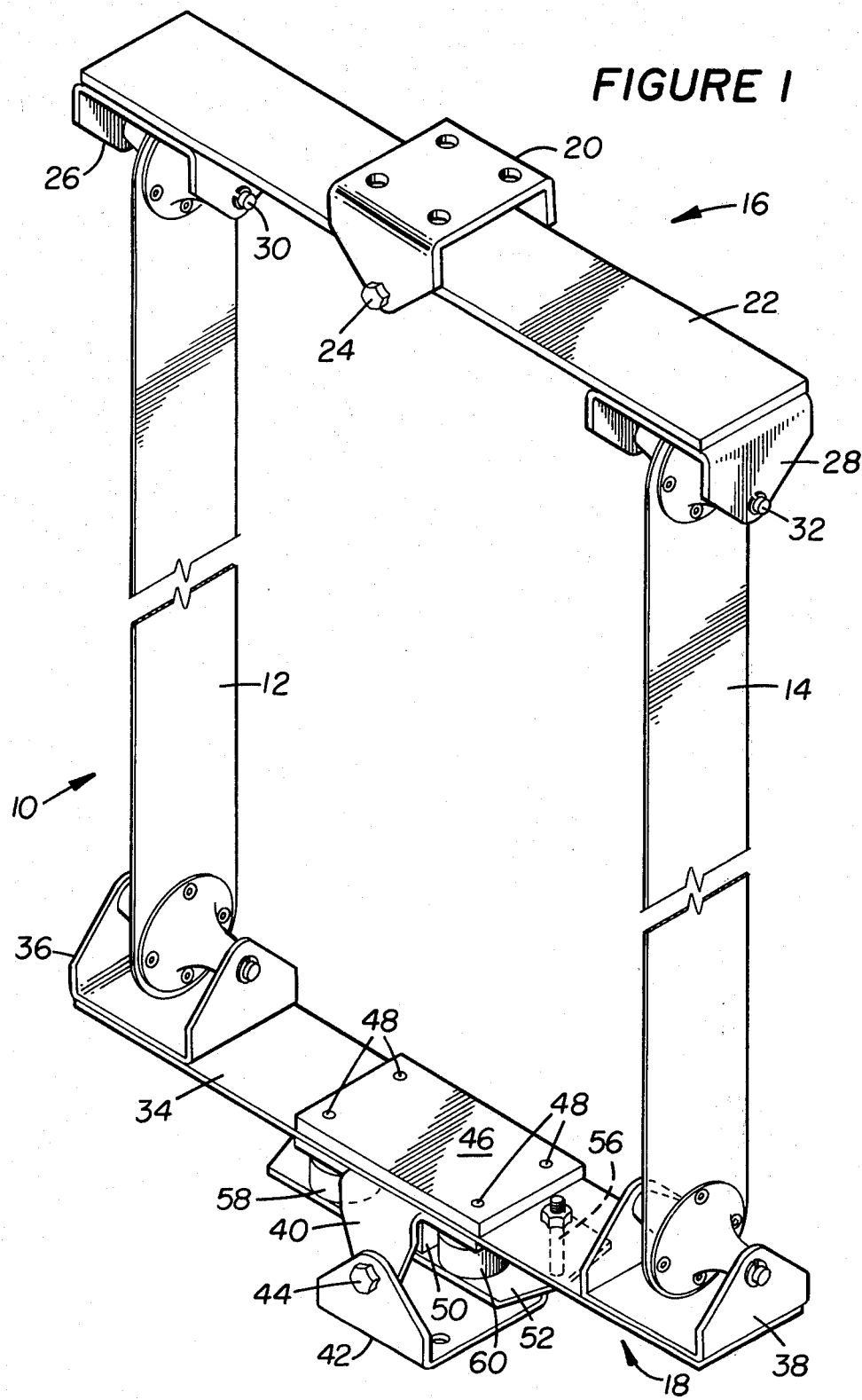
FIG. 1 is a perspective view of an embodiment of the invention.

With reference to the figures and in particular to FIG. 1, a preferred embodiment of the windmill is depicted and denoted by the numeral 10. The windmill 10 includes in this preferred embodiment two elongate and flexible members 12 and 14 which are also herein referred to as slats. As can be seen from FIG. 1, these slats are quite thin in comparison to their width and length. In this preferred embodiment, the slats can be comprised of either a plastic or a metallic material or other materials, which can withstand vibration and repeated torsional stress without undue material fatigue. Also it should be understood that alternatively the windmill may be comprised of only one of said slats or a plurality of said slats as shall be disclosed hereinbelow. Slats 12 and 14 are held at their upper ends in an upper mounting arrangement 16 and at their lower ends in a lower mounting arrangement 18. Mounting arrangement 16 includes a bracket 20 which can be secured to any permanent support (not shown), such as, for example, a building. Pivotally mounted to bracket 20 is a first arm 22 which is substantially rigid. Arm 22 can pivot about shaft 24 of bracket 20. At the ends of arms 22 are slat mounts 26 and 28, respectively. Said mounts 26,28 are secured to the ends of arm 22 by fastening means (not shown) which are well known in the art. Mounts 26 and 28 include shafts 30 and 32 which allow slats 12 and 14 to pivot about the axes defined by said shafts 30 and 32, which axes are substantially parallel to first arm 22. In the preferred embodiment of FIG. 1 it should be understood, however, that these axes can have different orientations with respect to arm 22 and still come within the spirit and scope of the invention.

The lower mounting arrangement 18 includes a second arm or spring arm 34 which in a preferred embodiment can be comprised of flexible spring steel. The slats 12 and 14 are secured at the ends of second arm 34 by slat mounts 36 and 38 which are substantially identical to mounts 26 and 28. Lower bracket 42 can be secured to a fixed support (not shown) in the same manner as upper brackets 20. A base plate 46 and appropriate fasteners 48 secure the second arm 34 to the base 40 as can be seen in FIG. 1. A base block 50 (FIG. 2) is secured to base 40 beneath second arm 34. A third flexible arm or driver arm 52 is secured to base block 50 and extends therefrom substantially parallel to second arm 34 towards the ends of said arm 34.

In a preferred embodiment third flexible arm 52 is comprised of, for example, spring steel as is second flexible arm 34. As can be seen in FIG. 2, projections 54 and 56 are secured to second arm 34 and extend downwardly so that they can come in contact with third arm 52. In a preferred embodiment these projections 54 and 56 include threaded shafts, the distance which said threaded shafts extend from said second arm 34 being adjustable by use of the nuts disposed on either side of the second flexible arm 34. Secured to base 40 and nested between said base and the third flexible arm 52 are transducer housings 58 and 60. Transducer housings 58 and 60 are weatherproof and electrically insulated. Transducers 62 and 64 are located in said transducer housing. In a preferred embodiment the transducers 62 and 64 are piezoelectric transducers. The upper and lower surface of each transducer is covered with an electrically conducting material 66 and 68 for transducer 62, and material 70 and 72 for transducer 64. For good electrical continuity with the piezoelectrical transducers, intimate contact between the conducting material and the transducer is required. To this end, the electrically conducting material can be either vacuum deposited on the transducer or painted thereon. The material can include, for example, silver. Immediately adjacent the electrically conducting material which is deposited on the piezoelectric crystals are upper and lower electrodes 74 and 76, and 78 and 80, respectively. These are essentially comprised of thin metallic sheets which can be comprised of copper and which are connected to the leads shown extending from the transducer housings 58 and 60, respectively. Insulating caps 82 and 84 are positioned adjacent to electrodes 74 and 76 and insulating caps 86 and 88 are adjacent to electrodes 78 and 80. In a preferred embodiment, these caps are comprised of a tough electrically insulating material such as, for example, an aluminum oxide based ceramic material. As the power output from a piezoelectric transducer is proportional to the compression it is important that this insulating cap be stiff and there be no local stresses in order to have more efficient power output. The upper insulating caps 82 and 86 are in contact with the base 40 and the lower insulating caps 84 and 88 are in contact with discs 90,92, respectively which discs rest upon the third flexible arm 52. It is estimated that the insulating materials above must withstand upwards of 2,000 volts without breaking down. It should be understood that the driver arm 52 is designed in such a way that it preloads the two piezoelectric transducers 62 and 64 so that upwards or downwards motion of the driver arm 52 causes an electric signal to be generated by the transducers.

It is to be understood that the arrangement of spring arm 34 and driver arm 52 provides a system with a mechanical advantage in that the force supplied at the end of the spring arm 34 is multiplied by the length of said arm divided by the length of the driver arm from base block 52 to one of the discs 90,92 to provide an increased force or pressure against the transducers. This double lever arrangement also provides a safety feature in that in high winds, which may cause exaggerated deflections of the spring arm 34, the projections 54,56 would merely lift off of the driver arm 52 allowing the transducers to only be exposed to the maximum designed stresses caused by the driver arm 52. It should be understood that in the alternative the slats can be secured directly to a driven or third arm 52 if the above advantage is not required.

Turning to FIG. 3, a schematic diagram showing an electrical circuit of the invention is depicted. This circuit can provide low voltage direct current or alternating current synchronized to commercial power lines as required. The signal issuing from the transducers 62 and 64 is substantially sinusoidal and is directed by the leads to rectifying systems 94 and 96 which in a preferred embodiment can be comprised of one or more diodes, depending on the voltage requirements. The rectified signal which can either be a half-wave rectification or a full-wave rectification is sent to an inverter 98. It is to be understood that the electrical signal from the transducers is of a high voltage and alternating current type with perhaps a frequency of between 30 and 50 Hz. It is depicted that if a number of these windmills are combined together, as is contemplated in FIG. 4 and as will be discussed hereinbelow, that it would be more efficient to sum the electrical outputs by converting them to direct current. With many windmills put together, the signal which is received by inverter 98 is be substantially a constant direct current voltage. The inverter 98 is used to invert the polarity of the signal it receives at selected intervals and can generate thereby, for example, a square wave. If required the inverter is hooked to a synchronous controller 100 which is connected to commercial power lines through leads 102. The synchronous controller 100 can allow the inverter 98 to operate at commercial frequencies which would be 60 Hz. The synchronous controller 100 also sets the phase of the current. A step-down transformer 104 is provided in communication with converter 98 and steps the voltage down from upwards of 2,000 volts to, for example, 110 volts. Accordingly, an appropriate alternating current signal can be taken from terminals 106 for domestic or commercial use.

If direct current is required, a low voltage rectifier circuit is provided at 108 and a storage battery at 110 for taking a direct current signal off of terminals 112. It is to be understood that if only alternating current is required that rectifier 108, battery 110, and terminals 112 can be removed from the circuitry. Also, if only direct current is required terminals 25 and synchronous controller 100 can be removed from this circuitry.

Possible configurations of the windmill units 10 are shown in FIGS. 4a through 4c. In FIG. 4a three windmill units 10 are provided in line. In FIG. 4b they are provided staggered so that the slats thereof describe a matrix and in FIG. 4c they are provided so that the slats substantially describe the perimeter of a circle. The various configurations can be selected depending on the space restrictions and wind considerations.

FIG. 5 illustrates large slat twisting or torsional vibrational motion wherein a portion of the slat has been twisted up to 180°. Such motion causes lengthwise displacement of the ends of the spring arm 34. It has been determined that such twisting motion is a dominant motion for such slats under moderate wind velocities. Such slats also experience sideways motion.

INDUSTRIAL APPLICABILITY

The operation of the windmill 10 of the invention is as follows. The windmill 10 is secured in an appropriate area where sufficient wind is available. As the wind moves by the slats of the windmill 10 the slats are either twisted as shown in FIG. 5 or deflected sideways, pivoting about the slat mounts, or both, in order to flex the spring arm. This causes the projections 54 and 56 to lift from the driver arm 52, causing greater pressure or compression to be placed on the piezoelectric transducers 62 and 64 and causing electrical signals to be generated. Then, as the slats vibrate, the spring arm 34 is allowed to move downwardly, causing projections 54 and 56 to urge the driver arm 52 downwardly relieving pressure from the transducers 62 and 64. As the transducers are prestressed by the driver arm 52, urging the driver arm 52 downwardly removes stress from these transducers and thereby also causes an electrical signal to be generated.

The power available from the windmill 10 is dependent on the wind velocity, the effective cross sectional area presented by the slat or slats, the efficiency with which the slats extract power from the wind, the efficiency of the coupling between the slat motion and the transducers, and the electromechanical efficiency of the piezoelectric transducer. It is to be understood that the cross sectional area presented by the slots is defined as the area which is perpendicular to the wind velocity. Further, as explained above, in moderate winds the slats move so much in a twisting manner they expose substantially the same amount of area to the wind no matter which direction the wind is coming from.

The wind velocity determines the maximum power available from the wind. The steady wind moving at velocity v, with a mass density per unit volume, r, has as an associated kinetic energy E, given by:

$$E = rv^2/2$$

The power in the wind P, of arriving on a cross sectional area A, perpendicular to the wind, is given by:

$$P = Arv^3/2$$

The amount of energy harvested by a windmill through an extended period depends on the minimum wind speed (the cut-in speed at which the windmill starts to operate), the wind speed when the energy conversion device reaches its operating limits (rated wind speed), and efficiency or power coefficient, C, for capturing the power in the wind (generally function of wind velocity).

It can be shown on general grounds that (M. Merriam "Solar Energy Technology Handbook," Chapter 22, Editors W. Dickenson and P. Cheremisinoff, Marcel Dekker, New York 1980) that the maximum power extractible from the wind is given by the expression:

$$P = C(Arv^3/2)$$

The maximum theoretical power coefficient, C(max) is 0.593 and is called the Betz limit. The wind machines or windmills generally have power coefficients of less than 0.45 and generally are less than 0.20. To insure a high value of C, in windmill 10, the tension and the length of the slats are chosen so that the edge velocity of the slats which is the velocity of that portion of the slat edge which hooks around in an arc to give the slat configuration as shown in FIG. 5, is comparable to the wind speed.

The cut-in speed for the slats can be made very low to favor areas where the average wind velocities are small. It is contemplated the efficiency versus wind speed for a windmill 10 should have a broader range of high efficiency than conventional windmills because of the lack of what is known as "tip speed" limitations experienced by rotating windmills. The "tip speed" is the speed of rotation of the tip of the windmill blade.

The area A for a conventional windmill is just the cross section swept by the blades. For a windmill 10, A is a function of the amplitude of motion and the orientation of the slats. Above the cut-in speed, the slats undergo a torsional and sideways motion that presents an area which is equal to the outline of the maximum excursion of the slat edge as shown in FIG. 5. This area depends on the wind velocity, the tension, the length and the torsional stiffness of the slat. The slat parameters are chosen in a trade-off between maximizing the tension variation of the slats and maximizing its swept area A. A large tension would indicate a small swept area while a small tension would indicate a large swept area. As the power output of the slats is proportional to both the tension and the swept area, this tradeoff must be met. Also, it should be noted that in a high wind situation a motion limiter may be required to protect slats of the windmill. As can be appreciated, in a high wind speed situation, the windmill 10 protects the piezoelectric transducers by causing the projections 54 and 56 to lift from the driver arm so that the energy of the wind is not translated to the transducers.

Further, the coupling between the motion of the slat end and the piezoelectric transducer is chosen to optimize their relative displacements. It has been found that the slat mount arrangement as shown in FIG. 1 allows for better energy transfer from the wind through the slats to the spring arm 34. The twisting of the slat is not inhibited and the ends of the slat can pivot.

The electromechanical efficiency of the transducer is determined by the characteristic of the material as given by the manufacturer thereof. An appropriate selection could be the EC-55 material from the Edo Western Corporation.

An alternate embodiment of the windmill 120 is shown in FIG. 6. In windmill 120 the slats 122 are rigidly secured to the first arm 124 by bracket 126 so as not to pivot. First arm 124 is pivotally secured to a universal joint 128 which is itself pivotally secured to a bracket 120 which can be secured to a stationary object. This embodiment works in the same manner as the previous embodiment except that the axes of rotation are translated to the mounting bracket 130 and do not appear at the end of the slats 122.

It is to be understood that other transducers (not shown) can be operatively coupled to the second spring arm 34. As example, a coil of copper wire can be affixed to the arm and the arm can allow the coil to move relative to a magnetic field, generating current. Obviously other transducer arrangements are possible.

An alternate embodiment of a transducer arrangement is shown in FIG. 7. Piezoelectric transducer 140 is substantially a hollow cylinder. An inner hollow cylindrical electrical conductor 142 is secured to the inner cylindrical surface of transducer 140 with appropriate electrically conducting glue and the like. Conductor 142 extends downwardly from transducer 140 into contact with spring arm 52'. An outer hollow cylindrical electrical conductor 144 is secured to the outer cylindrical surface of transducer 140 with appropriate electrically conducting glue and the like. Conductor 144 extends upwardly from transducer 140 into contact with base 40'. A housing 60' protects this arrangement. In operation driver arm 52' places compression force on inner conductor 142, causing shear forces or stresses on inner and outer cylindrical surfaces of transducer 140. Accordingly, an electrical signal is generated which can be measured across heads 146. Such an arrangement has the advantage of allowing the use of a large area of the transducer for securing the conductor and allowing a greater surface area per volume of transducer in a compact manner. Such an arrangement presents better impedance matching characteristics and a lower voltage with a higher current output.

Other aspects, objects and advantages of this invention can be obtained from a study of the drawings, the disclosure and the appended claims.

I claim:

1. Apparatus for generating energy from a source of fluid in motion comprising:
   means disposed in the fluid for torsional movement in response to the movement of the fluid therepast, said means including a flexible member;
   means operably coupled to said torsional movement means for converting said torsional movement into usable energy; and
   said converting means including:
   a first arm;
   means for securing said flexible member to said first arm at one point on the flexible member;
   a second flexible arm;
   means for securing said flexible member to said second flexible arm at another point on the flexible member spaced from the one point, said second flexible arm being displaceable by the torsional movement of the flexible member;
   a transducer; and
   second means for operably coupling said transducer to said second flexible arm.

2. The apparatus of claim 1 wherein said first arm is flexible.

3. The apparatus of claim 1 wherein said torsional movement means includes means for allowing sideways movement.

4. The apparatus of claim 1 wherein said moving means includes a plurality of flexible members and the converting means is operably coupled to said plurality of flexible members.

5. The apparatus of claim 1 wherein said flexible member includes a flexible slat.

6. The apparatus of claim 1 wherein said flexible member is thin and elongate.

7. The apparatus of claim 1 wherein said transducer includes a hollow cylinder, and said second means for operably coupling includes a first conductor secured to the inner cylindrical surface of the cylinder, which first conductor extends axially from the transducer in one direction and a second conductor secured to the outer cylindrical surface of the cylinder, which second conductor extends axially from the transducer in an opposite direction, and wherein said second flexible arm is urged against one of the conductors to set up shear stress between the transducer and each conductor by the torsional movement of the flexible member.

8. Apparatus for generating energy from a source of fluid in motion comprising:
   means disposed in the fluid for torsional movement in response to the movement of the fluid therepast, said means including a flexible member;
   means operably coupled to said torsional movement means for converting said torsional movement into usable energy; and
   said converting means includes a flexible arm and means for securing said flexible member to said flexible arm such that said flexible member can pivot about an axis which is disposed substantially parallel to said arm but is restricted from twisting movement at the point where the flexible member is secured to the flexible arm.

9. Apparatus for generating energy from a surce of fluid in motion comprising:
   means disposed in the fluid for torsional movement in response to the movement of the fluid therepast, said means including a flexible member;
   means operably coupled to said torsional movement means for converting said torsional movement into usable energy; and
   said converting means including:
   a flexible first arm;
   means for securing said flexible member to said flexible first arm so that said flexible first arm is displaced by the movement of said flexible member in response to the movement of the fluid therepast;
   a second flexible arm;
   a transducer;
   second means for operably coupling said transducer to said second flexible arm; and
   third means for operably coupling said first and second arms with a mechanical advantage.

10. The apparatus of claim 9 wherein said second flexible arm is biased against said transducer.

11. The apparatus of claim 10 wherein:
    said arms are secured at one end to a base;
    said third coupling means includes a projection extending from one of said arms which is capable of contacting the other of said arms; and
    the distance from said base to the means for securing said flexible member to said first arm is greater than the distance from the base to the projection.

12. The apparatus of claim 11 wherein said transducer is spaced from said base and the distance between said base and said projection is greater than the distance from the base to the transducer.

13. Apparatus for generating energy from a source of fluid in motion comprising:
    means disposed in said fluid for moving in response to the movement of the fluid therepast said means including a flexible member; and
    means operatively coupled to said moving means for converting said movement into usable energy, said converting means including a piezoelectric transducer; and
    said converting means including:
    a flexible first arm;
    means for securing said flexible member to said first arm so that said flexible first arm is displaced by the movement of said flexible member in response to the movement of the fluid therepast;
    a second flexible arm operably coupled to the piozoelectric transducer; and second means for operably coupling said first and second arms with a mechanical advantage.

14. The apparatus of claim 13 wherein said flexible first arm is urged against said piezoelectric transducer upon the movement of said moving means in response to the movement of the fluid therepast.

15. The apparatus of claim 13 wherein said second flexible arm is biased against said piezoelectric transducer.

16. The apparatus of claim 13 wherein:
said arms are secured at one end to a base;
said second coupling means including a projection extending from one of said arms which is capable of contacting the other of said arms; and
the distance from said base to the means for securing said flexible member to said first arm is greater than the distance from the base to the projection.

17. The apparatus of claim 16 wherein said piezoelectric transducer is spaced from said base and the distance between said base and projection is greater than the distance from the base to the piezoelectric transducer.

18. The apparatus of claim 13 wherein said moving means includes a plurality of flexible members and the converting means is operably coupled to said plurality of flexible members.

19. The apparatus of claim 13 wherein said transducer is a hollow cylinder and said converting means further includes a first conductor secured to the inner cylindrical surface of the cylinder, which first conductor extends axially from the transducer in one direction and a second conductor secured to the outer cylindrical surface of the cylinder, which second conductor extends axially from the transducer in an opposite direction, and wherein said second flexible arm is urged against one of the conductors to set up shear stresses between the transducer and each conductor.

20. The apparatus of claim 13 wherein said flexible member includes a flexible slat.

21. Apparatus for generating energy from a source of fluid in motion comprising:
means disposed in said fluid for moving in response to the movement of the fluid therepast, said means including a flexible member; and
means operatively coupled to said moving means for converting said movement into usable energy, said converting means including a piezoelectric transducer; and
wherein said converting means includes a flexible arm and means for securing said flexible member to said flexible arm such that said flexible member can pivot about an axis which is disposed substantially parallel to said arm but is restricted from twisting movement at the point where the flexible member is secured to the flexible arm.

22. Apparatus for generating energy from a source of fluid in motion comprising:
means disposed in the fluid for torsional movement in response to the movement of the fluid therepast, said means including a flexible member;
means operably coupled to said torsional movement means for converting said torsional movement into usable energy; and
said converting means including:
a first mount;
means for securing said flexible member to said first mount at one point on the flexible member;
a flexible arm;
means for securing said flexible member to said flexible arm at another point on the flexible member spaced from the one point, said second flexible arm being displaceable by the torsional movement of the flexible member;
a transducer; and
second means for operably coupling said transducer to said flexible arm.

* * * * *